Nov. 3, 1953     H. W. SAMOLEWITZ     2,657,500
TRANSPARENT DOLL EYE

Filed Jan. 3, 1951     2 Sheets-Sheet 1

INVENTOR.
HANS W. SAMOLEWITZ
BY James and Franklin
HIS ATTORNEYS

Nov. 3, 1953        H. W. SAMOLEWITZ        2,657,500
TRANSPARENT DOLL EYE

Filed Jan. 3, 1951        2 Sheets-Sheet 2

*INVENTOR.*
HANS W. SAMOLEWITZ
BY *James and Franklin*
HIS ATTORNEYS

Patented Nov. 3, 1953

2,657,500

UNITED STATES PATENT OFFICE 2,657,500

TRANSPARENT DOLL EYE

Hans W. Samolewitz, Bayonne, N. J., assignor to Margon Corporation, Bayonne, N. J., a corporation of New Jersey Application January 3, 1951, Serial No. 204,150

20 Claims. (Cl. 46—169)

This invention relates to artificial eyes for toys, and more particularly for dolls.

Expensive doll eyes have been made out of glass. Inexpensive eyes have been made out of lithographed sheet metal, but lack lustre and depth. In the past decade or more doll eyes have been made by securing a transparent lens representing the pupil and iris portions of the eye, in a generally hemispherical shell made of metal or white celluloid or a molded plastic. This provides a good eye which is far less costly than a glass eye, but which still is somewhat expensive to manufacture.

One problem is to provide the desired deep black pupil portion. Some eyes have an indentation which is filled manually with black color. Some include a rearwardly projecting stud having the pupil diameter, the said stud serving to receive a color disc which lends color to the iris portion, and which at the same time masks the iris portion so that black color may be applied to the rear end of the stud portion rather freely, only the stud portion itself showing from the front of the eye.

The primary object of the present invention is to generally improve the manufacture of doll eyes. A more particular object is to simplify the provision of the desired black pupil portion. I have discovered that a deep black pupil portion may be obtained without using black coloring at all. Instead the pupil portion of the lens is made transparent, and the eye is employed with a doll head which is otherwise light-proof so that it has a dark interior. The back of the pupil portion is made non-reflective to incident light. What is wanted is total absorption of light. In simple form the pupil portion is made smooth and flat, and exposes the black interior of the head. The elimination of the manual operation of applying black coloring to the pupil area is a significant factor in reducing the cost of manufacture of the eye.

A further object is to simplify the coloring of the iris portion of the eye. I have found that a brown eye may be obtained by tinting the transparent material with brown; a blue eye by tinting it with blue; and a gray eye by letting the material remain clear or untinted. The back of the iris portion, unlike the back of the pupil portion, is roughened or serrated to provide it with facets which reflect incident light. The resulting reflection of light makes the brown or blue tint visible despite the black interior of the doll head, and without requiring the use of extraneous coloring material on either the front or the back sides of the iris portion. I have further found that the presence of a slight brown or blue tint in no way mars the deep black appearance of the pupil. In the case of the gray eye no tinting of the transparent material is needed. I believe this is because there is only partial reflection of the incident light, or, in other words, because some of the darkness of the interior of the head is visible through the transparent material, thus resulting in a natural gray color which contrasts with the black pupil. The tone or darkness of the resulting gray eye depends, of course, on the degree of reflectivity of the iris portion.

In a natural eye the iris portion is not uniformly colored, and instead appears darker near the periphery than near the center or pupil. Various expedients have been resorted to in the past in an effort to attain this appearance in an artificial doll eye. In some cases the back of the iris portion has been printed near its periphery but not near the pupil. In other cases a color disc has been used which is printed darker near the periphery.

Another object of the present invention is to provide the desired gradation of color between the pupil and the periphery of the iris without necessitating the use of printed color discs or other extraneous means. This is done by increasing the number of light reflecting facets per unit of area near the pupil compared to the periphery. Assuming serrations are employed, the spacing between the serrations is made much greater near the periphery than it is near the pupil. Inasmuch as the color of the iris depends on the reflection of incident light, and the reflection is greater at the center, the color is lighter at the center and darker near the rim.

In accordance with a further feature and object of the invention, not only the lens, but the entire eyeshell may be made out of a single body of transparent material, tinted appropriately for the eye color desired, except where an eye of gray color is desired, in which case tinting is omitted. The eyeball portion is coated white, and the eyelid portion is coated a flesh color above the iris and white portions. If desired, the trunnions, weight arm, and weight of the eye also may be molded integrally with the eyeshell, and here again it is found convenient and inexpensive to employ a transparent plastic for the entire structure, the plastic material being appropriately tinted blue or brown for a blue or brown eye, or left untinted for a gray eye, even though the only point at which the color of the plastic is used is at the iris.

To accomplish the foregoing objects, and other more specific objects which will hereinafter appear, my invention resides in the doll and eye elements, and their relation to one another, as are more particularly described in the following specification. The specification is accompanied by drawings, in which.

Figure 1:
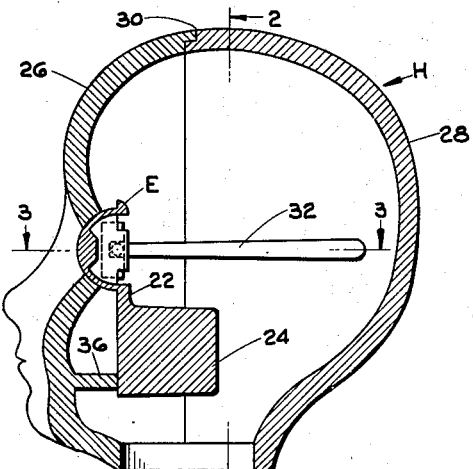
Fig. 1 is a section taken in elevation through a doll head embodying features of my invention.
Figure 2:
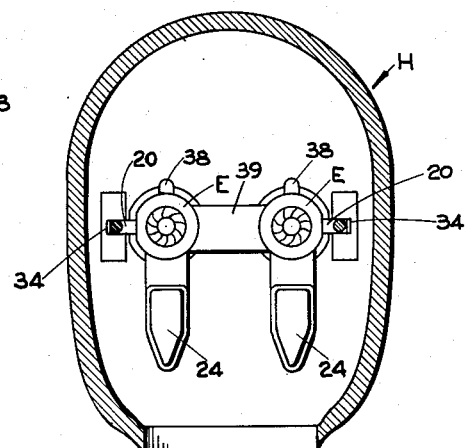
Fig. 2 is a section taken approximately in the plane of the line 2—2 of Fig. 1.
Figure 3:
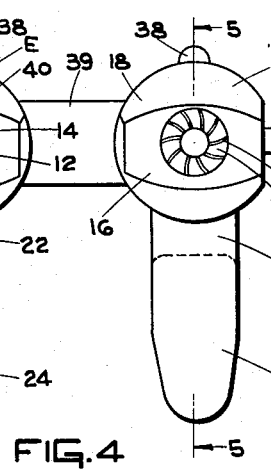
Fig. 3 is a horizontal section taken approximately in the plane of the line 3—3 of Fig. 1.

Referring to the drawing, and more particularly to Figs. 1, 2 and 3, I there show the combination of a doll head H having eye openings receiving eyes E. The head is light-proof to provide a black interior. In all forms of the invention the pupil portion is transparent, and has a smooth flat non-reflective back surface. Thus the pupil appears black, without necessitating the use of an extraneous black coating of any kind.

Figure 4:
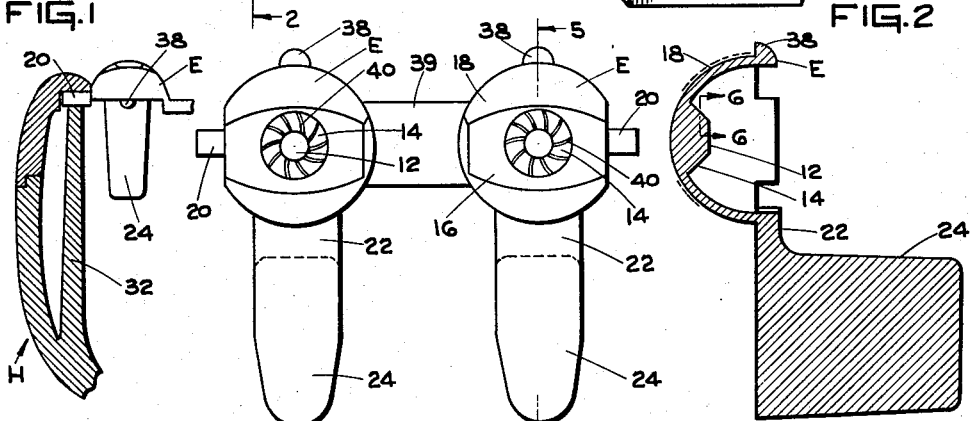
Fig. 4 is drawn to larger scale, and is a front elevation of the eyeset prior to insertion in the head.

The eyes in the present case are molded to form a pupil portion 12 (Figs. 4 and 5), an iris portion 14, an eyeball portion 16, an eyelid portion 18, trunnions 20, a weight arm 22, and weight portion 24, all made out of a single body of a transparent plastic material suited for injection molding. The integrally molded piece may also include stops 38 formed at the top of each eye for limiting the closing movement of the eye. The operation of the eye is conventional in that when the doll is in horizontal position the weight portions 24 remain downward and so relatively turn the eyes to sleeping position, that is, with the iris portion moved below the lower edge of the eye opening, and with the eyelid portion of the eye exposed in the eye opening.

The head itself is divided into a front portion 26 and a rear portion 28, these being secured together on a seam 30. The rear portion 28 has molded therewith a pair of forwardly projecting fingers 32. The front head portion 26 has open bearing slots 34 molded integrally therewith, and the parts are so relatively dimensioned and located that the trunnions 20 of the eyeset may be placed in the bearing slots 34 and the rear half 28 of the head added, at which time the forward ends of the bearing fingers 32 abut the trunnions 20 and hold the same against escape from the open bearing slots. The forward half of the head is preferably molded with stops 36 which serve to limit the opening movement of the eyes.

In accordance with the present invention the entire movable eye assembly is preferably made of a transparent plastic which is tinted for the iris color desired in the case of blue or brown eyes. Where gray eyes are desired, the tinting of the transparent plastic material is omitted. The eyeshell is substantially hemispherical, and the forward portion is printed or coated with white to simulate the eyeball portion of the eye. This is indicated at 16 in Figs. 4 and 5. The white color may be applied by hand or by spraying with the aid of a mask.

Similarly the flesh colored eyelid portion 18 is provided by applying a flesh color above the iris and the white portion 16. Here again the color may be applied by hand or by spraying with the aid of a mask.

Figure 5:
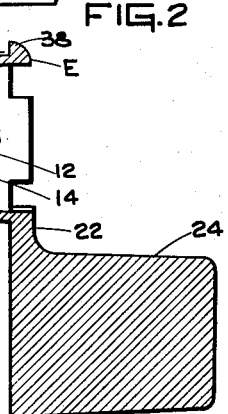
Fig. 5 is a transverse section taken approximately in the plane of the line 5—5 of Fig. 4.
Figure 6:
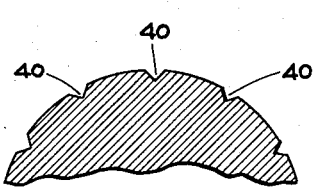
Fig. 6 is a fragmentary section drawn to greatly enlarged scale, and is taken approximately in the plane of the line 6—6 of Fig. 5.

Referring now to Fig. 5 of the drawing, the iris portion 14 may be frusto-conical in shape, while the pupil portion 12 is smooth and flat to provide a non-reflective back surface. The iris portion 14 is preferably roughened or serrated, and in the present case is provided with a series of generally radial but more truly helical grooves, indicated at 40 in Fig. 4. The sides of these grooves are preferably disposed at an angle of 90 degrees to one another, this being best shown in Fig. 6 in which it will be seen that each groove 40 is a channel having side walls disposed perpendicular to one another. While this is not essential it is most efficient for the reflection of incident light, for it results in a prism-like mirror effect with maximum reflection.

Figure 7:
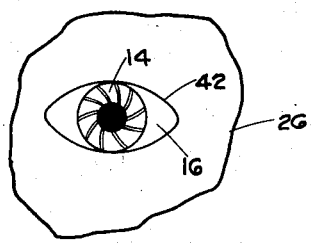
Fig. 7 is a fragmentary front elevation showing the eye as exposed through the eye opening in the head.

Referring now to Fig. 7, the front wall 26 of the doll head has an elliptical eye opening 42 through which the white portion 16 as well as the pupil and iris of the eye are exposed when the eye is open. In Fig. 7 the pupil is black, and it will be understood that this blackness results not from the addition of extraneous coloring material at the back of the pupil as heretofore provided, but rather from the total absorption or lack of reflection of incident light at the pupil, combined with the fact that the head is sealed or light-proof, so that it has a perfectly black interior. From one viewpoint it may be said that one sees a block pupil because one looks through the transparent pupil at the black interior of the head. The iris portion 14, by contrast, has a reflective surface and a light color.

Moreover, from inspection of Fig. 7 it will be seen that because of the generally radial nature of the serrations they are more closely spaced near the pupil than near the periphery. There is accordingly a greater intensity to light reflection near the pupil than near the periphery. In consequence the color of the iris portion is darker near the periphery, and this is desirable because it is a characteristic of the natural eye.

Figure 8:
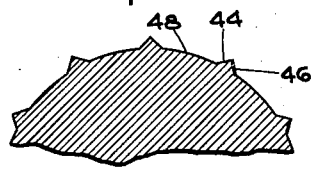
Fig. 8 is a section similar to Fig. 6 but showing a modification.

It is not essential that the serrations be indented, and instead they may project from the back surface of the iris. This is illustrated in Fig. 8, which is a section similar to Fig. 6, but which shows how the light reflecting surfaces 44 and 46 may be provided outside the frustroconical surface 48 and yet be disposed in the preferred perpendicular relation to one another. Such an arrangement also acts as a prism to reflect incident light.

While I have so far described an eye which is molded integrally with mounting means such as the trunnions, and operating means such as the weight, this is not at all essential, and if desired the eye may be made separately and later secured to appropriate mounting and operating means.

Figure 9:
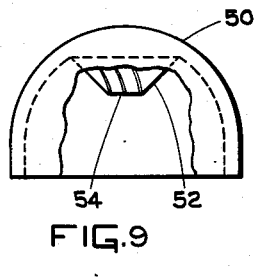
Fig. 9 is a side elevation of a doll eye with a part of the shell broken away.
Figure 10:
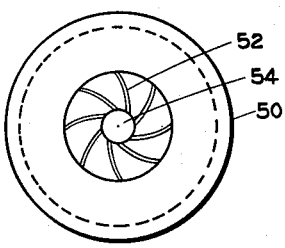
Fig. 10 is a front elevation of the eye shown in Fig. 9.

Thus, referring to Figs. 9 and 10 of the drawing, the eye there shown comprises, as before, a generally hemispherical shell 50 formed integrally with a frusto-conical iris portion 52 and a flat pupil portion 54. The iris portion 52 is preferably serrated as previously described. To complete the eye shown in Figs. 9 and 10 white coloring is provided around the iris to simulate the eyeball. The shell is colored above the iris with a flesh color to simulate the eyelid. An eyelash may be provided by slotting the shell above the iris and inserting and securing the lash material in place. The plastic employed is transparent, and as before, may be tinted appropriately for the desired eye color, except where a gray eye is desired, whereupon the untinted and natural transparency of the plastic material is relied upon to furnish the gray color. Except for the omission of the mounting and operating means all of the previous description is applicable to the eye shown in Figs. 9 and 10.

Figure 11:
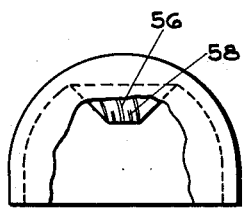
Fig. 11 shows a modification having an increased number of serrations near the pupil.
Figure 12:
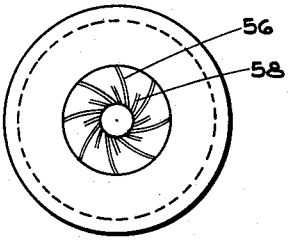
Fig. 12 is a front elevation of the same.

Figs. 11 and 12 illustrate a modification in which the number of radial serrations for light reflection are relatively increased near the non-reflective pupil. More specifically, there are full-length serrations 56 which extend all the way from the pupil to the periphery of the iris like those previously shown, and there are also shorter serrations 58 which radiate from the pupil outwardly but do not extend as far as the periphery of the iris. It will be evident that this increases the difference in reflection between the inner and outer portions of the iris. Thus the periphery of the iris is relatively darkened not only by the increased spacing between the radial serrations, but also by the reduction in the number of serrations.

Figure 13:
Fig. 13 shows still another modification.
Figure 14:
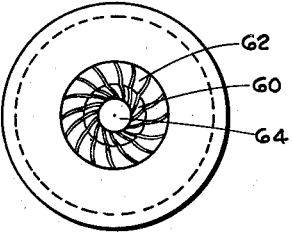
Fig. 14 is a front elevation of the same.

Figs. 13 and 14 illustrate still another modification in which the inner portion 60 of the iris is more steeply frusto-conical than the outer portion 62, the latter being nearly flat. The pupil portion 64 is smooth and non-reflective as before. The theory underlying the present form of the invention is that there is greater reflection of incident light from the frusto-conical portion of the iris than from the flat portion of the iris, thus lightening the center portion compared to the periphery.

Figure 15:
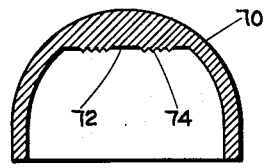
Fig. 15 is a section through a modified eye having a lens portion the back of which is flat instead of frustro-conical.
Figure 16:
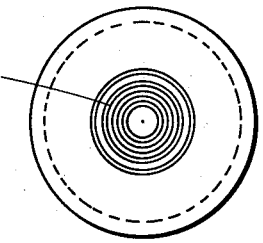
Fig. 16 is a front elevation of the eye shown in Fig. 15.

However, it is important to understand that it is not essential to provide any frusto-conical portion at all, and eyes having a flat iris portion are illustrated in Figs. 15 through 18 of the drawing. Referring first to Fig. 15, it will be seen that the generally hemispherical eyeshell 70 has pupil and iris portions 72 and 74 which are coplanar. The essential difference then between the pupil and iris portions is that the pupil portion 72 is made smooth and non-reflective to incident light, in contrast with the iris portion 74 which is roughened or faceted or serrated to encourage the reflection of incident light. The serrations need not be radial or helical, and Fig. 16 shows the use of circular or concentric annular serrations 76. These annular serrations may be spaced more closely together at the center and further apart toward the periphery of the iris portion, thus providing a lighter color near the center and a relatively darker color near the periphery.

While the use of annular serrations is effective to provide the desired reflection of incident light, in contrast with the non-reflective pupil, it does not produce a finished eye which is as natural in appearance as one having the generally radial or helical serrations. This is so because the natural eye frequently has apparent lines or markings on the iris which are somewhat star-like or radial in appearance. Thus the radial serrations serve the dual purpose of providing the desired reflection of incident light and of simulating natural iris lines. Indeed, in certain doll eyes of prior construction it has been customary to provide radial serrations for the express purpose of simulating natural iris lines, and without any thought of producing a reflection of incident light in contrast with an adjacent non-reflective pupil portion, for in such eyes it has been customary to provide a color disc or back plate behind the iris portion.

Figure 17:
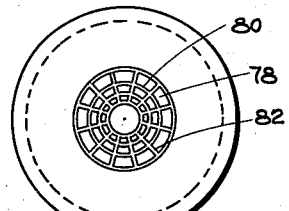
Fig. 17 shows a modification.

Fig. 17 shows a modification in which the iris portion 78 has both annular serrations 80 and radial serrations 82.

Figure 18:
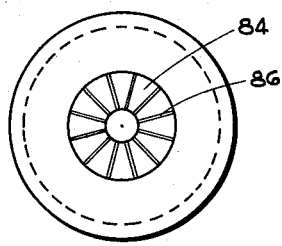
Fig. 18 shows still another modification.

Fig. 18 shows still another modification in which the iris portion 84 has only radial serrations 86. In this case they are straight line serrations which are truly radial. In each of Figs. 16, 17 and 18 it is assumed that the iris portion is flat as shown in Fig. 15. However, it may be mentioned that annular serrations as shown in Figs. 16 and 17 may be employed with a frusto-conical iris portion instead of a flat iris portion. Moreover, the straight line radial serrations shown in Fig. 18 may be employed on a frusto-conical iris portion as well as on a flat iris portion. Similarly the somewhat spiral or helically shaped radial serrations shown in Figs. 9 through 14 may be employed with a flat iris portion such as is shown in Fig. 15.

The use of a frusto-conical iris portion has some advantage in increasing the apparent depth of the eye. Indeed in some prior eyes this effect has been increased by using a cylindrical stud projecting rearwardly and having the diameter of the pupil, with the black coloring applied at the end of the stud. Such a pupil stud may be employed with the present invention, that is, while omitting black coloring, but I have found that it is preferable to omit the stud, partly for simplicity, and partly to avoid any possibility of unwanted reflection of light from the cylindrical wall of the stud.

Figure 19:
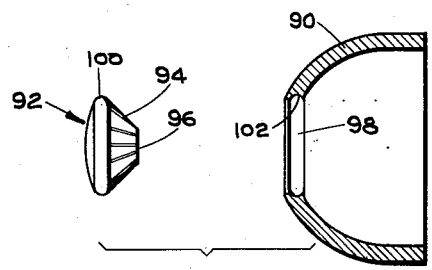
Fig. 19 shows some features of the invention in an eye having a lens separate from the shell.

In the eyes shown in Figs. 9 through 18 it has been assumed that the pupil and iris portions are molded integrally with the eyeshell. This too is not essential for practice of the present invention, and in order to illustrate that fact a two-piece eye is shown in Fig. 19. This eye comprises a generally hemispherical eyeshell 90 and a lens generally designated 92. The lens has a front surface which conforms to the spherical surface of the eye, while its rear surface is shaped to provide an iris portion 94 and a pupil portion 96. In the present case the iris portion 94 is frusto-conical and is provided with radial serrations. The pupil portion 96 is smooth and flat and non-reflective to incident light. The lens 92 is received in a mating opening 98 in the eyeshell 90. The parts may be secured together in various ways such as cementing or by mechanically interlocking the parts together. In the present case the periphery of the lens is a convex bead 100 adapted to snap into a mating concave rim 102 in the eyeshell, thus locking the parts together.

With a two-piece construction it will be understood that the lens 92 is made of transparent plastic, while the shell 90 may be and preferably is made of opaque material, for example, white plastic. By using white plastic no coating is needed to simulate the eyeball. A flesh color may be applied above the iris opening to simulate the eyelid, but the remainder of the shell is left white. The transparent plastic for the lens is, of course, given a brown tint, or a blue tint, or left clear, depending on whether the eye simulation is to be brown, blue, or gray.

The separate doll eyes shown in Figs. 9 through 19 may be mounted in a doll head in any of a large number of known ways, but for purposes of the present invention it is preferable that the mounting means do not include a metallic clip or key immediately behind the center of the eye, or in any event, if such a key be employed, it is preferable that it does not have a bright metallic forward edge, for in such case there may be some undesired reflection of light from the key through the pupil portion of the eye, thus spoiling the desired complete absorption of light.

It will be understood that the various features of the eye described in connection with Figs. 9 through 19 of the drawing are applicable to a complete integrally molded eyeset such as that shown in Figs. 1 through 5 of the drawing. To be more specific, any of the eyes shown in Figs. 9 through 19 may, if desired, be molded integrally with one or more trunnions or/and a weight arm and weight or/and motion-limiting means, etc. It will also be understood that in each case the eye, while devoid of extraneous or externally applied coloring material for the pupil and iris, the pupil and iris being unobstructed by any part of the eye in a direction axially of the pupil and iris, is nevertheless a finished eye without such material, and that in each case it is intended to be used, and is used, with a doll head which is fully enclosed except for the eye, so that the interior of the head is light-proof and dark.

While Figs. 1 through 5 show a pair of eyes molded together, it will be understood that the eyes may be molded separately, that is, each eye may be molded with two trunnions and each be moved by its own weight arm and weight. Conversely, when the two eyes are connected together as shown in Figs. 1 through 5, they may in many cases be provided with only a single weight arm and a single weight to operate both eyes. While the eyes are shown connected by a broad, flat strap of material 39, they may be connected by a square bar or round shaft, etc.

One particular plastic which I have found satisfactory for the present process is cellulose acetate butyrate. Others may be used, but the plastic is preferably one adapted for injection molding.

It is believed that the construction of my improved doll eyes and the method of combining the same with a light-proof head, as well as the advantages thereof, will be apparent from the foregoing detailed description. It will also be apparent that while I have shown and described my invention in a number of preferred forms, changes may be made in the structures shown without departing from the scope of the invention as sought to be defined in the following claims.

I claim:

1. A finished doll eye intended for use in a light-proof enclosed doll head, said eye having pupil and iris portions made out of a single body of transparent material, said pupil and iris portions both being devoid of extraneous coloring material and being unobstructed by any part of the eye in a direction axially of the pupil and iris portions, said pupil portion having a smooth, flat, relatively non-reflective back surface which appears black, and said iris portion having a roughened or serrated back surface which reflects light of a color similar to the color of the transparent material.

2. A finished doll eye intended for use in a light-proof enclosed doll head, said eye having pupil and iris portions made out of a single body of transparent material, said pupil and iris portions both being devoid of extraneous coloring material and being unobstructed by any part of the eye in a direction axially of the pupil and iris portions, said pupil portion having a smooth, flat, relatively non-reflective back surface which appears black, and said iris portion having a roughened or serrated back surface which reflects light of a color similar to the color of the transparent material, said iris portion having a frustro-conical back surface, and the serrations on the back surface of the iris portion being more closely spaced near the center or pupil portion than at the periphery of the iris portion in order to provide a graduated tinting of the iris, with the iris darker near is periphery and lighter near the pupil.

3. A finished doll eye intended for use in a light-proof enclosed doll head, said eye having pupil, iris, and eyeball portions all made out of a single body of transparent material, said eyeball portion being coated white outside the iris portion, said pupil and iris portions both being devoid of extraneous coloring material and being unobstructed by any part of the eye in a direction axially of the pupil and iris portions, said pupil portion having a smooth, flat, relatively non-reflective back surface which appears black, and said iris portion having a roughened or serrated back surface which reflects light of a color similar to the color of the transparent material.

4. A finished doll eye intended for use in a light-proof enclosed doll head, said eye having pupil, iris, and eyeball portions all made out of a single body of transparent material of appropriate tint for the eye color desired, said eyeball portion being coated white on the front side thereof outside the iris portion, said pupil and iris portions both being devoid of extraneous coloring material, and being unobstructed by any part of the eye in a direction axially of the pupil and iris portions, said pupil portion having a smooth, flat, relatively non-reflective back surface which appears black, and said iris portion having a roughened or serrated back surface which reflects light of a color similar to the color of the transparent material, said iris portion having a frustro-conical back surface, and the serrations on the back surface of the iris portion being more closely spaced near the center or pupil portion than at the periphery of the iris portion in order to provide a graduated tinting of the iris, with the iris darker near its periphery and lighter near the pupil.

5. A finished doll eye intended for use in a light-proof enclosed doll head, said eye having a pupil, iris, eyeball, weight portion and means for pivotally mounting the eye, all made out of a single body of transparent material, said eyeball portion being coated white outside the iris portion, said pupil and iris portions both being devoid of extraneous coloring material and being unobstructed by any part of the eye in a direction axially of the pupil and iris portions, said pupil portion having a smooth, substantially flat, relatively non-reflective back surface which appears black and said iris portion having a roughened or serrated back surface which reflects light of a color similar to the color of the transparent material.

6. A finished doll eye intended for use in a light-proof enclosed doll head, said eye having a pupil, iris, eyeball, weight portion and means for pivotally mounting the eye, all made out of a single body of transparent material of appropriate tint for the eye color desired, said eyeball portion being coated white on the front side thereof outside the iris portion, said pupil and iris portions both being devoid of extraneous coloring material and being unobstructed by any part of the eye in a direction axially of the pupil and iris portions, said pupil portion having a smooth, substantially flat, relatively non-reflective back surface which appears black, said iris portion having a roughened or serrated back surface which reflects light of a color similar to the color of the transparent material, said iris portion having a frustro-conical back surface, and the serrations on the back surface of the iris portion being more closely spaced near the center or pupil portion than at the periphery of the iris portion in order to provide a graduated tinting of the iris, with the iris darker near its periphery and lighter near the pupil.

7. A finished doll eye-set intended for use in a light-proof enclosed doll head, said eye-set being formed out of a single body of transparent material and comprising a pair of spaced eyes, a weight portion and means for pivotally mounting the eye-set, said eyes each having pupil, iris and eyeball portions, said eyeball portion being coated white outside the iris portion, and said pupil and iris portions both being devoid of extraneous coloring material and being unobstructed by any part of the eye in a direction axially of said pupil and iris portions, said pupil portion having a smooth, substantially flat, relatively non-reflective back surface which appears black, and said iris portion having a roughened or serrated back surface which reflects light of a color similar to the color of the transparent material.

8. A finished doll eye-set intended for use in a light-proof enclosed doll head, said eye-set being formed out of a single body of transparent, plastic material of appropriate tint for the eye color desired and comprising a pair of spaced eyes, a weight portion for each eye and trunnions for pivotally mounting the eye-set, said eyes each having pupil, iris and eyeball portions, said eyeball portion being coated white on the front side thereof outside the iris portion, and said pupil and iris portions both being devoid of extraneous coloring material and being unobstructed by any part of the eye in a direction axially of said pupil and iris portions, said pupil portion having a smooth, substantially flat, relatively non-reflective back surface which appears black, and said iris portion having a roughened or serrated back surface which reflects light of a color similar to the color of the transparent material, said iris portion having a frustro-conical back surface and the serrations on the back surface of the iris portion being more closely spaced near the center of the pupil portion than at the periphery of the iris portion in order to provide a graduated tinting of the iris, with the iris darker near its periphery and lighter near the pupil.

9. A finished doll eye intended for use in a light-proof enclosed doll head, said eye having pupil and iris portions made out of a single body of clear, untinted transparent material, said pupil and iris portions both being devoid of extraneous coloring material and being unobstructed by any part of the eye in a direction axially of the pupil and iris portions, said pupil portion having a smooth, substantially flat, relatively non-reflective back surface which appears black, and said iris portion having a roughened or serrated back surface which reflects light of a gray color.

10. A finished doll eye intended for use in a light-proof enclosed doll head, said eye having pupil, iris and eyeball portions all made out of a single body of clear, untinted transparent material, said eyeball portion being coated white outside the iris portion, said pupil and iris portions both being devoid of extraneous coloring material and being unobstructed by any part of the eye in a direction axially of the pupil and iris portions, said pupil portion having a smooth, substantially flat, relatively non-reflective back surface which appears black, and said iris portion having a roughened or serrated back surface which reflects light of a gray color.

11. A finished doll eye intended for use in a light-proof enclosed doll head, said eye having pupil, iris and eyeball portions all made out of a single body of clear, untinted transparent material, said eyeball portion being coated white outside the iris portion, said pupil and iris portions both being devoid of extraneous coloring material and being unobstructed by any part of the eye in a direction axially of the pupil and iris portions, said pupil portion having a smooth, substantially flat, relatively non-reflective back surface which appears black, and said iris portion having a roughened or serrated back surface which reflects light of a gray color, said iris portion having a frusto-conical back surface, and the serrations on the back surface of the iris portion being more closely spaced near the center or pupil portion than at the periphery of the iris portion in order to provide a graduated tinting of the iris, with the iris darker near its periphery and lighter near the pupil.

12. In combination, a doll head having eye openings but which is otherwise light-proof to provide a dark interior, and doll eyes fitting said eye openings, said eyes having pupil and iris portions made out of a single body of transparent material, said pupil and iris portions both being devoid of extraneous coloring material and being unobstructed by any part of the eye in a direction axially of the pupil and iris portions, said pupil portion having a smooth, substantially flat, relatively non-reflective back surface which appears black, and said iris portion having a roughened or serrated back surface which reflects light of a color similar to the color of the transparent material.

13. In combination, a doll head having eye openings but which is otherwise light-proof to provide a dark interior, and doll eyes fitting said eye openings, said eyes having pupil, iris and eyeball portions all made out of a single body of transparent material, said eyeball portion being coated white outside the iris portion, said pupil and iris portions both being devoid of extraneous coloring material and being unobstructed by any part of the eye in a direction axially of the pupil and iris portions, said pupil portion having a smooth, substantially flat, relatively non-reflective back surface which appears black and said iris portion having a roughened or serrated back surface which reflects light of a color similar to the color of the transparent material.

14. In combination, a doll head having eye openings but which is otherwise light-proof to provide a dark interior, and doll eyes fitting said eye openings, said eyes having pupil, iris and eyeball portions made out of a single body of transparent material of appropriate tint for the eye color desired, said eyeball portion being coated white on the front side thereof outside the iris portion, said pupil and iris portions both being devoid of extraneous coloring material and being unobstructed by any part of the eye in a direction axially of the pupil and iris portions, said pupil portion having a smooth, substantially flat, relatively non-reflective back surface which appears black, and said iris portion having a roughened or serrated back surface which reflects light of a color similar to the color of the transparent material, said iris portion having a frustro-conical back surface, and the serrations on the back surface of the iris portion being more closely spaced near the center or pupil portion than at the periphery of the iris portion in order to provide a graduated tinting of the iris, with the iris darker near its periphery and lighter near the pupil.

15. In combination, a doll head having eye openings but which is otherwise light-proof to provide a dark interior, and doll eyes fitting said eye openings, said eyes having a pupil, iris, eyeball, weight portion and means for pivotally mounting same, all made out of a single body of transparent material, said eyeball portion being coated white outside the iris portion, said pupil and iris portions both being devoid of extraneous coloring material and being unobstructed by any part of the eye in a direction axially of the pupil and iris portions, said pupil portion having a smooth, substantially flat, relatively non-reflective back surface which appears black, and said iris portion having a roughened or serrated back surface which reflects light of a color similar to the color of the transparent material.

16. In combination, a doll head having eye openings but which is otherwise light-proof to provide a dark interior, and an eye-set having eyes fitting said eye openings, said eye-set being formed out of a single body of transparent material and comprising a pair of spaced eyes, a weight portion and means for pivotally mounting the eye-set, said eyes each having pupil, iris and eyeball portions, said eyeball portion being coated white outside the iris portion, said pupil and iris portions both being devoid of extraneous coloring material and being unobstructed by any part of the eye in a direction axially of said pupil and iris portions, said pupil portion having a smooth, substantially flat, relatively non-reflective back surface which appears black, and said iris portion having a roughened or serrated back surface which reflects light of a color similar to the color of the transparent material.

17. In combination, a doll head having eye openings but which is otherwise light-proof to provide a dark interior, and an eye-set having eyes fitting said eye openings, said eye-set being formed out of a single body of transparent plastic material of appropriate tint for the eye color desired and comprising a pair of spaced eyes, a weight portion for each eye and trunnions for pivotally mounting the eye-set, said eyes each having pupil, iris and eyeball portions, said eyeball portion being coated white on the front side thereof outside the iris portion, and said pupil and iris portions both being devoid of extraneous coloring material and being unobstructed by any part of the eye in a direction axially of said pupil and iris portions, said pupil portion having a smooth, substantially flat, relatively non-reflective back surface which appears black, and said iris portion having a roughened or serrated back surface which reflects light of a color similar to the color of the transparent material, said iris portion having a frustro-conical back surface and the serrations on the back surface of the iris portion being more closely spaced near the center of the pupil portion than at the periphery of the iris portion in order to provide a graduated tinting of the iris, with the iris darker near its periphery and lighter near the pupil.

18. In combination, a doll head having eye openings but which is otherwise light-proof to provide a dark interior, and doll eyes fitting said eye openings, said eyes having pupil and iris portions made out of a single body of clear, untinted transparent material, said pupil and iris portions both being devoid of extraneous coloring material and being unobstructed by any part of the eye in a direction axially of the pupil and iris portions, said pupil having a smooth, substantially flat, relatively non-reflective back surface which appears black, and said iris portion having a roughened or serrated back surface which reflects light of a gray color.

19. In combination, a doll head having eye openings but which is otherwise light-proof to provide a dark interior, and doll eyes fitting said eye openings, said eyes having pupil, iris and eyeball portions all made out of a single body of clear, untinted transparent material, said eyeball portion being coated white outside the iris portion, said pupil and iris portions both being devoid of extraneous coloring material and being unobstructed by any part of the eye in a direction axially of the pupil and iris portions, said pupil portion having a smooth, substantially flat, relatively non-reflective back surface which appears black, and said iris portion having a roughened or serrated back surface which reflects light of a gray color, said iris portion having a frustro-conical back surface, and the serrations on the back surface of the iris portion being more closely spaced near the center or pupil portion than at the periphery of the iris portion in order to provide a graduated tinting of the iris, with the iris darker near its periphery and lighter near the pupil.

20. A finished doll eye intended for use in a doll head, said eye including pupil and iris portions made out of a single body of transparent material and both intended to cooperate with a black background, said pupil portion having a smooth substantially flat relatively non-reflective back surface which appears black with the aid of said black background, and said iris portion having a roughened or serrated back surface which reflects light of a color similar to the color of the transparent material despite the black background, whereby the contrast between the iris portion and the pupil portion results solely from the reflective nature of the iris portion and the non-reflective nature of the pupil portion with both pupil and iris portions exposed to the black background.

HANS W. SAMOLEWITZ.

References Cited in the file of this patent

UNITED STATES PATENTS

| Number | Name | Date |
| --- | --- | --- |
| 1,963,129 | Grubman | June 19, 1934 |
| 2,051,876 | Marcus | Aug. 25, 1936 |
| 2,206,545 | Cesare | July 2, 1940 |
| 2,425,510 | Cohn | Aug. 12, 1947 |
| 2,466,278 | Rupert | Apr. 5, 1949 |
| 2,546,682 | Wilhelm | Mar. 27, 1951 |